(12) United States Patent
Zheltov et al.

(10) Patent No.: US 7,685,588 B2
(45) Date of Patent: Mar. 23, 2010

(54) PLATFORM INDEPENDENT BINARY INSTRUMENTATION AND MEMORY ALLOCATION METHOD

(75) Inventors: Sergey N. Zheltov, Nizhniy Novgorod (RU); Stanislav V. Bratanov, Nizhniy Novgorod (RU); Dmitry Eremin, Nizhniy Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1119 days.

(21) Appl. No.: 10/563,313

(22) PCT Filed: Mar. 28, 2005

(86) PCT No.: PCT/RU2005/000144

§ 371 (c)(1),
(2), (4) Date: Dec. 29, 2005

(87) PCT Pub. No.: WO2006/104407

PCT Pub. Date: Oct. 5, 2006

(65) Prior Publication Data

US 2008/0155510 A1    Jun. 26, 2008

(51) Int. Cl.
*G06F 9/45* (2006.01)
*G06F 9/445* (2006.01)
(52) U.S. Cl. .......... 717/158; 717/159; 717/161
(58) Field of Classification Search ......... 717/151–153, 717/155–161
See application file for complete search history.

(56) References Cited

U.S. PATENT DOCUMENTS

| | | | | |
|---|---|---|---|---|
| 4,926,322 A | * | 5/1990 | Stimac et al. ........... | 703/23 |
| 5,835,701 A | * | 11/1998 | Hastings ............... | 714/35 |
| 6,192,513 B1 | * | 2/2001 | Subrahmanyam ........... | 717/155 |
| 6,618,824 B1 | * | 9/2003 | Hastings ............... | 714/35 |
| 6,865,735 B1 | * | 3/2005 | Sirer et al. ........... | 717/158 |
| 6,968,540 B2 | * | 11/2005 | Beck et al. ............ | 717/130 |
| 7,096,462 B2 | * | 8/2006 | Chan et al. ............ | 717/159 |
| 7,185,328 B2 | * | 2/2007 | Grover ................. | 717/156 |

(Continued)

OTHER PUBLICATIONS

Shuf et al, "Exploiting prolific types for memory management and optimization", ACM POPL pp. 295-306, 2002.*

(Continued)

*Primary Examiner*—Anil Khatri
(74) *Attorney, Agent, or Firm*—Trop, Pruner & Hu, P.C.

(57) ABSTRACT

Embodiments of the present invention provide for platform independence, low intrusiveness, and optimal memory usage of the binary instrumentation process by means of employing one procedure (interceptor function) implemented in a high-level programming language to intercept an arbitrary number of functions or blocks of code. Each time a function or code block needs to be intercepted a new copy of the procedure from a provided memory region may be associated with the address of the function or block of code by means of a memory region descriptor and an intercepted function address table. Once activated, the interceptor function may retrieve its current address and, by searching memory region descriptors, determine the region the current address belongs to; the region's base address may then be obtained. A reference to the intercepted function address table may be fetched from the region descriptor; and an index to the intercepted function address table may be computed. Finally, the address of an intercepted function corresponding to the active copy of the interceptor function may be read from the intercepted function address table.

28 Claims, 4 Drawing Sheets

U.S. PATENT DOCUMENTS

| | | | |
|---|---|---|---|
| 7,210,118 B2 * | 4/2007 | Hastings | 717/100 |
| 7,269,828 B2 * | 9/2007 | Civlin | 717/158 |
| 7,293,260 B1 * | 11/2007 | Dmitriev | 717/130 |
| 7,415,712 B2 * | 8/2008 | Hunt | 719/315 |
| 7,484,205 B2 * | 1/2009 | Venkatapathy | 717/158 |
| 7,500,077 B2 * | 3/2009 | Krauss | 711/170 |
| 2002/0152455 A1 | 10/2002 | Hundt et al. | |
| 2003/0037318 A1 | 2/2003 | Ramasamy et al. | |

OTHER PUBLICATIONS

Liu et al, "Implementing adaptive performance management in server applications", IEEE SEAMS, pp. 1-10, 2007.*

Kumar et al, "Transparent debugging of dynamically instrumented programs", ACM SIGARCH, vol. 33, No. 5, pp. 57-62, 2005.*

Binder et al, "Parallelizing calling context profiling in virtual machines on multicores", ACM PPPJ, pp. 111-120, 2009.*

Hollingsworth, et al: MDL: A Language and Compiler for Dynamic Program Instrumentation; IEEE 1997; pp. 201-212.

Kagstrom, et al: Automatic Low Overhead Program Instrumentation with the LOPI Framework; Proceedings of the 9th Annual Workshop on interaction between Compilers and Computer Architectures; IEEE (INTERACT '05); 12 pages.

PCT/RU2005/000144 Int'l Search Report and Written Opinion dated Mar. 28, 2006.

* cited by examiner

PLATFORM INDEPENDENT BINARY INSTRUMENTATION AND MEMORY ALLOCATION METHOD

The present application claims priority based on International Application No. PCT/RU2005/000144, entitled "A PLATFORM INDEPENDENT BINARY INSTRUMENTATION METHOD" filed Mar. 28, 2005.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present invention relates generally to the binary code instrumentation domain, and, more specifically, to methods of designing platform-independent binary instrumentation systems.

2. Description

The process of binary instrumentation is widely used in software analysis, correctness checking, debugging, and performance monitoring, as well as in other areas where it has proved to comprise an efficient means of gaining control over a program being analyzed.

The idea behind binary instrumentation is to modify a compiled executable module prior to its execution to enable further analysis and/or debugging. Operating on binary executables eliminates the computational complexity normally associated with the processing of source codes, facilitates the creation of universal instrumentation and analysis systems, and enables dynamic instrumentation to be performed at runtime.

Many of the state-of-the-art binary instrumentation systems are highly dependent on processor instruction coding and other low-level system properties, and thus have to employ assembly language and very often are designed to operate on a limited set of software platforms or hardware architectures.

In addition, using an assembly language to implement platform-dependent code decreases the ease of debugging and support for the entire instrumentation system and sometimes prevents portability.

Therefore, a need exists for the capability to provide higher portability and manageability for binary instrumentation systems.

BRIEF DESCRIPTION OF THE DRAWINGS

The features and advantages of the present invention will become apparent from the following detailed description of the present invention in which.

DETAILED DESCRIPTION

An embodiment of the present invention is a method of implementing platform-independent binary instrumentation systems. The independence of specific hardware platforms may be achieved by employing multiple copies of the same procedure implemented in a high-level programming language as a substitution (interceptor) function that receives control prior to an original (intercepted) function. Additional means are provided to dynamically adapt to system memory conditions and the number of original functions to intercept.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the. specification are, not necessarily all referring to the same embodiment.

The following definitions may be useful for understanding embodiments of the present invention described herein.

Binary Instrumentation is a process of modifying binary executable code in order to intercept particular regions of execution (e.g., specific functions) and transfer control to an external program (or a program code embedded in the binary executable being instrumented) to perform necessary operations.

An original function is an automatically determined or user-specified functional block (code region) identified by its starting address within a program to be instrumented.

An interceptor function is a functional block that gains control each time an original function is invoked, identifies the original function to call, optionally performs registration or analysis operations, and finally passes execution to the original function.

An instrumenting function is a functional block used to establish correspondence between the starting addresses of original and interceptor functions (in order to enable transfer of control to a corresponding interceptor function prior to executing an original function).

Figure 1:
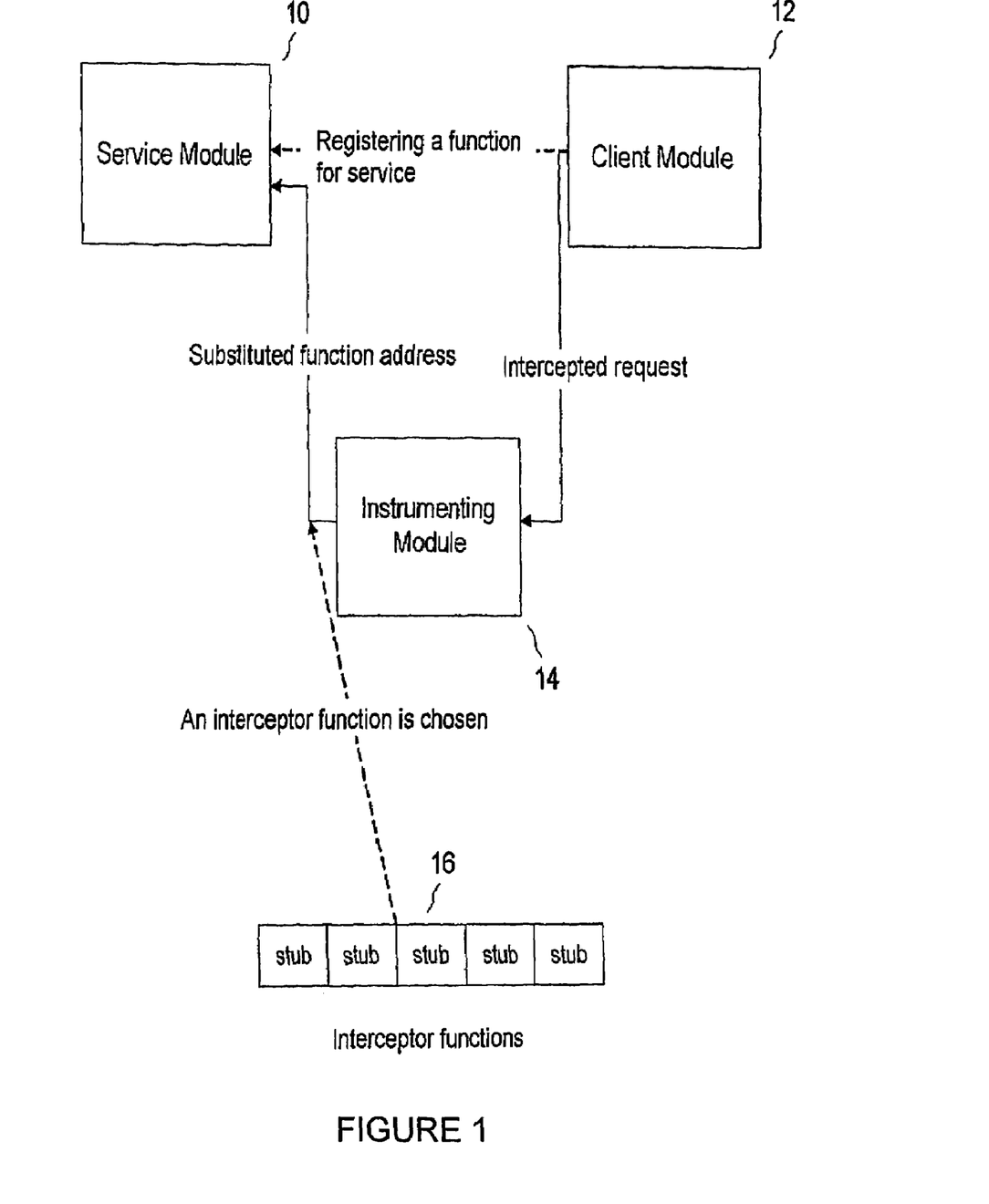
FIG. 1 is a diagram illustrating an exemplary runtime binary instrumentation system and relations between an original function, an instrumenting block, and an interceptor function.

FIG. 1 provides an example of a runtime binary instrumentation system.

According to FIG. 1, in one example client module 12 may register a function address with service module 10 for further service during the normal flow of operation. Instrumenting module 14 may intercept the registration request and substitute the original function address with an address of a selected interceptor function copy 16 chosen in accordance with an embodiment of the present invention. A runtime instrmentation system was chosen as the most complex case when the total number of functions to instrument is not known in advance. A more popular case of instrumenting a stand-alone executable module is similar to one described in FIG. 1 with the only exception being that all initial addresses of functions to be intercepted pertain to one target module and may be pre-computed, and the information of the total number of such addresses may be used to optimize (or simplify) memory allocation. Embodying the platform-independent binary instrumentation method described herein may help seamlessly handle both cases.

Figure 2:
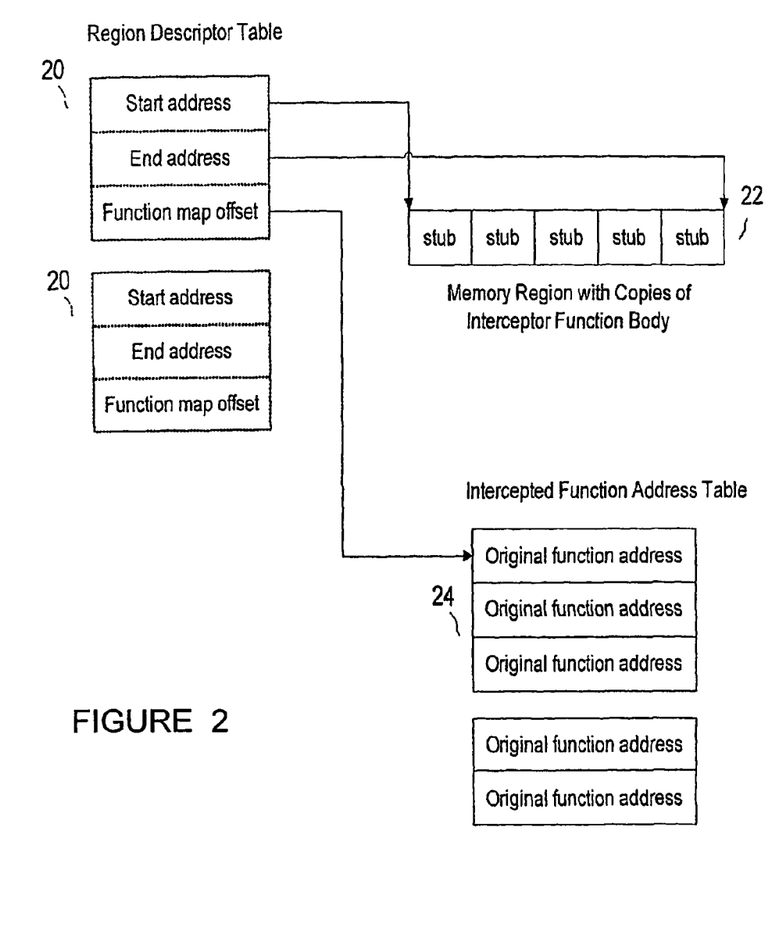
FIG. 2 is a diagram illustrating the layout of data structures employed in the process of binary instrumentation in accordance with an embodiment of the present invention.

FIG. 2 depicts the general layout of data structures that may be used by the instrumenting module to establish an efficient mapping between the original and interceptor functions according to embodiments of the present invention. An embodiment of the present invention may utilize the same interceptor function code for all functions being intercepted but (in order to differentiate between multiple function instances) the interceptor function code may be copied to a different location (so that the execution is always transferred to different addresses for different intercepted functions). All such copies of the interceptor function may be organized in contiguous memory regions 22, normally allocated at runtime. This allows the instrumentation system to dynamically adapt to the number of functions to be instrumented (as it may not be known in advance).

In order to control the distribution of the above mentioned regions, a region descriptor table (RDT) is provided. The region descriptor table contains a plurality of region descriptors 20 which, in their turn, comprise at least the addresses of the beginning and the end of a region (the latter address may be substituted by the length of the region depending on what is preferable for a particular system architecture) and a reference (or an offset called a function map offset herein) to an intercepted function address table 24. The intercepted function address table contains addresses of all intercepted functions.

Figure 3:
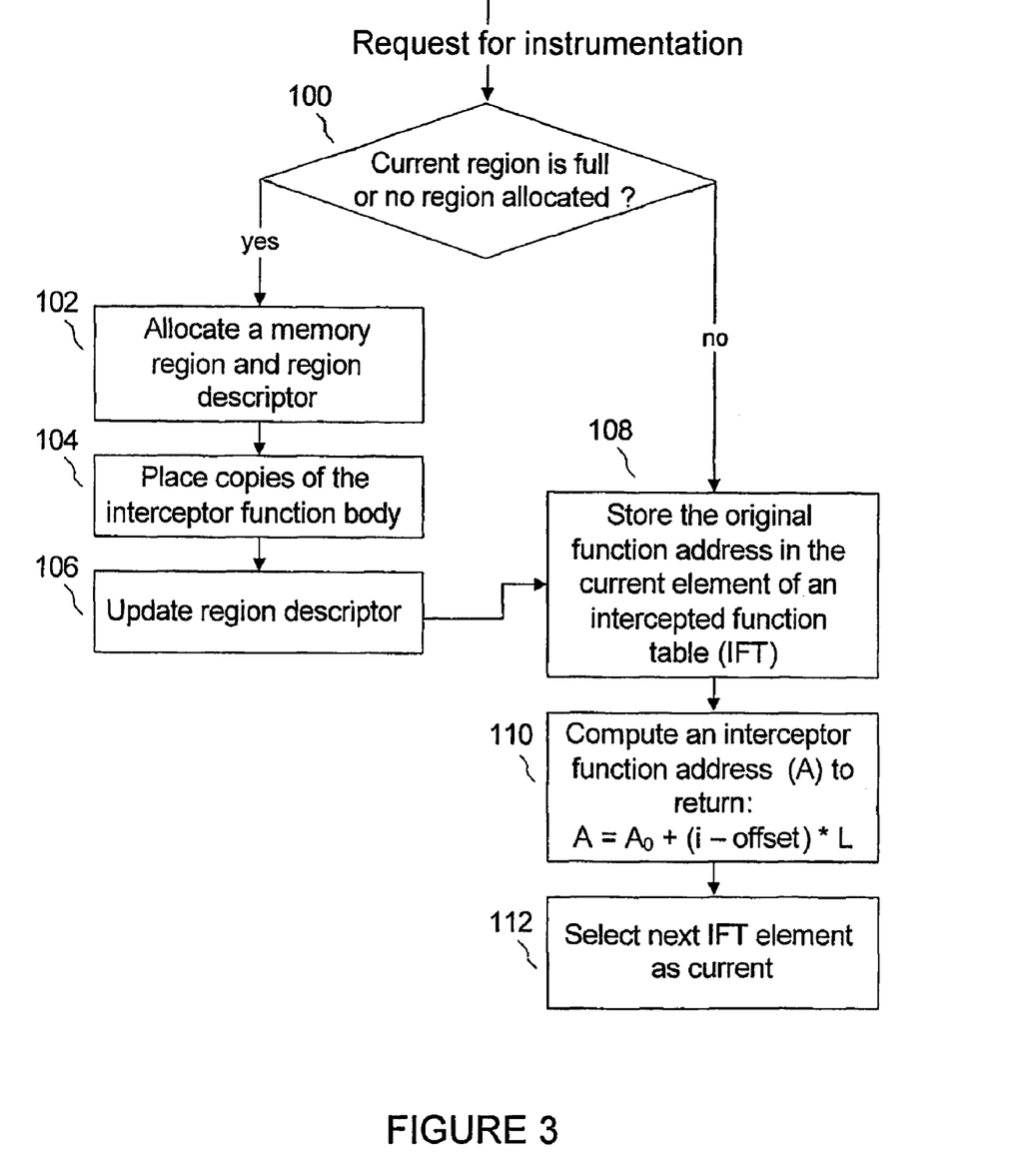
FIG. 3 is a flow diagram illustrating the instrumenting function operation according to an embodiment of the present invention.

FIG. 3 is a flow diagram illustrating the instrumenting function operation according to an embodiment of the present invention. Upon the initial request to instrument (intercept) a function or a code block, it may be determined if a current region is full or if no region is allocated at block 100. If the current region is allocated or no region is allocated, then a binary instrumentation system (as shown in Appendix A, for example) may allocate (at block 102) a memory region of a pre-defined (or pre-calculated) length and place a copy of the interceptor function body (at block 104) into that region. The corresponding region descriptor may be updated with appropriate addresses and a current offset to the intercepted function address table (IFT) at block 106. Then, the current element of the IFT may be initialized with the address of the function being intercepted (original function) at block 108. In case it is determined to be more efficient to have the memory region pre-initialized with the copies of the interceptor function, the address for a specific copy to be returned in reply to the current request (A) may be computed at block 110 as follows: $A=A_0+(i-\text{offset})*L$; wherein $A_0$ is the starting address of the current memory region, L denotes the size of the interceptor function, i is the index of the current IFT element, and offset comprises an offset to IFT from the current region descriptor table. Then, at block 112, a next successive element of IFT may be selected as current.

The procedure may be repeated for each new function to intercept. In case the allocated memory region is full (checked at block 100), a new region may be allocated and a corresponding region descriptor updated accordingly.

The above described procedure provides an efficient mapping between a particular interceptor function copy and an intercepted function. This enables a non-intrusive interceptor function to be implemented as shown in FIG. 4.

Figure 4:
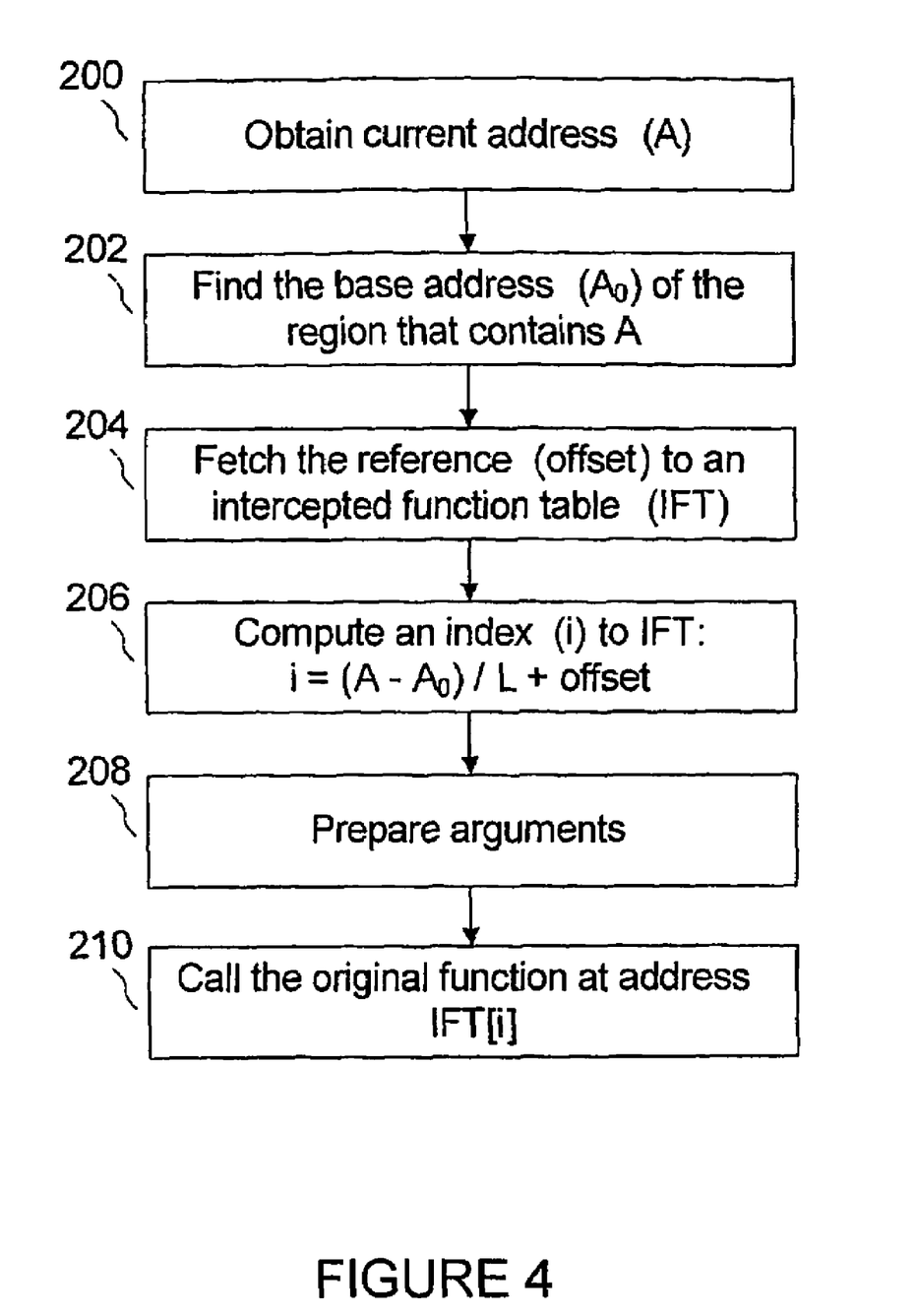
FIG. 4 is a flow diagram illustrating the interceptor function operation in accordance with an embodiment of the present invention.

According to FIG. 4, the interceptor function, once activated, may retrieve (at block 200) its current address being executed and, by searching the region descriptor table (RDT), determine the region the current address belongs to, then obtain the region's base address from a corresponding RDT entry (from a corresponding region descriptor) at block 202. A reference (i.e., an offset) to an intercepted function address table (IFT) may be fetched from the same region descriptor at block 204. An index (i) to IFT (to map the currently executed copy of the interceptor function and the original function address) may be computed at block 206 as follows:

$i=(A-A_0)/L+\text{offset}$; wherein A is the current address, $A_0$ is the starting address obtained from the RDT, L denotes the size of the interceptor function, and offset comprises an offset to the intercepted function address table.

At block 208, the arguments to pass to the original function may be prepared, and the original function may be called via a function pointer IFT[i] at block 210.

It should be noted that in some embodiments, the operations at blocks 200, 208, and 210 may be performed by calling built-in compiler functions available in most modern compilers. In order to avoid efficient address confusion when copying the compiled interceptor function code, it is recommended to call these built-in functions via function pointers.

For an exemplary, non-limiting embodiment of the present invention implemented in C language refer to Appendix A. The C code is provided for the purpose of illustration only and does not constitute a complete software binary instrumentation system. The code is to provide a pointer to an interceptor function for each function to be intercepted, to employ the same code for all interceptor functions, and, at the same time, avoid using platform-specific assembly language. One skilled in the art will recognize the option of introducing additional parameters to the region descriptor data structure to control the filling and allocation of memory regions without departing from the scope of the present invention.

Furthermore, one skilled in the art will recognize that embodiments of the present invention may be implemented in other ways and using other programming languages.

The techniques described herein are not limited to any particular hardware or software configuration; they may find applicability in any computing or processing environment. The techniques may be implemented in logic embodied in hardware, software, or firmware components, or a combination of the above. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable tangible medium having stored thereon instructions that may be used to program a processing system or other electronic device to perform the methods. The term "machine readable medium" used herein shall include any tangible medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, Furthermore, it is common in the art to speak of software, in one form or another (e.g., program, procedure, process, application, module, logic, and so on) as taking an action or causing a result. Such expressions are merely a shorthand way of stating the execution of the software by a processing system to, cause the processor to perform an action or produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

APPENDIX A

© 2004 Intel Corporation

A C code example of instrumentation process.

The example code is to provide a pointer to an interceptor function for each function to be intercepted, to employ the same code for all interceptor functions, and, at the same time, avoid using platform-specific assembly language.

Note that in this example an additional field in the Region Descriptor (curr_addr) is introduced to control the filling and allocation of memory regions. Calls to the compiler's built-in functions are implemented via function pointers to avoid effective address confusion while copying the interceptor function body.

The presented code implements a statically allocated Intercepted Function address Table (IFT) and provides indices (offsets) to the IFT in Region Descriptors. One skilled in the art will recognize the option of implementing dynamic IFT allocation schemes and storing direct references (pointers) to the elements of IFT in region descriptors while staying within the scope of the present invention.

This code may be embedded in a dynamic instrumentation system and operate at runtime intercepting calls to any requested function, or constitute a part of a stand-alone binary instrumentation module operating on a given executable.

```
// Region descriptor
typedef struct
{
    void* start_addr;
    void* end_addr;
    int faddr_offset;
    void* curr_addr;
} rdesc;
// Original function address
typedef struct
{
    void* original_address;
} faddr;
// Region Descriptor Table
rdesc* rdescTab;
// Intercepted Function address Table (IFT)
faddr* faddrTab;
// Size of Interceptor Function Body (may be computed dynamically)
int fbsize;
```

```
// Size of Region (may be adjusted dynamically in case of low memory)
int rsize;
// Interceptor Function Body pointer
void* fbody = (void*)stub;
// This function receives the original address of a function to intercept
// and returns the address of an interceptor function body
void* instrument_function(void* original_address)
{
    static int curr_offset = 0;
    static int curr_region = 0;
    if(!rdescTab[curr_region].start_addr)
    {
        rdescTab[curr_region].start_addr = malloc(rsize);
        rdescTab[curr_region].end_addr                  =
            rdescTab[curr_region].start_addr +
                                                 rsize;
        rdescTab[curr_region].curr_addr                  =
            rdescTab[curr_region].start_addr;
        rdescTab[curr_region].faddr_offset = curr_offset;
    }
    faddrTab[curr_offset] = original_address;
    memcpy(rdescTab[curr_region].curr_addr, fbody, fbsize);
    void* ret = rdescTab[curr_region].curr_addr;
    rdescTab[curr_region].curr_addr += fbsize;
    curr_offset++;
    if(rdescTab[curr_region].curr_addr                  ==
        rdescTab[curr_region].end_addr)
    {
        curr_region++;
    }
    return ret;
}
// Pointers to compiler's built-in functions
void* (*builtin_args)() = __builtin_apply_args;
void* (*builtin_apply)(void*, void*, int) = __builtin_apply;
void* get_current_address()
{
    return __builtin_return_address(0);
}
// Interceptor Function Body
int stub(int arg, ... )
{
    int idx;
    void* addr = get_current_address();
    for(i = 0; rdescTab[i].start_addr; i++)
    {
        if(addr >= rdescTab[i].start_addr && addr < rdescTab[i].end_addr)
        {
            idx = rdescTab[i].faddr_offset +
                (addr − rdescTab[i].start_addr) / fbsize;
            break;
        }
    }
    void *args = builtin_args();
    void *ret = builtin_apply(faddrTab[idx], args, 104);
}
```

What is claimed is:

1. A method of binary instrumentation comprising:

using a processor, coupled to a memory, to allocate a contiguous memory region included in the memory, wherein a total number of original functions to be intercepted is unknown at the time of the allocation;

filling the memory region with (A) first and second platform independent high level non-assembly language copies of an interceptor function (B) but not any version of the original functions;

initializing a first data structure with at least a starting address, length of the allocated memory region, and a reference to a second data structure;

storing an address of one of the original functions to be intercepted in a current element of the second data structure upon request for instrumentation; and providing a starting address of the second copy of the interceptor function upon request for instrumentation;

wherein instructions for allocating the memory region, filling the memory region, and initializing the first data structure are executed upon initial request for instrumentation so that each time an additional original function needs to be intercepted a new copy of the interceptor function is associated with the additional original function.

2. The method of claim 1, wherein allocating a memory region, filling the memory region, and initializing the first data structure are performed if all interceptor function copies of currently allocated memory regions are associated with previous requests for instrumentation.

3. The method of claim 1, further comprising duplicating the first data structure to associate each new copy of the first data structure with each newly allocated memory region.

4. The method of claim 1, wherein the second data structure comprises elements to store addresses of original functions instrumentation was requested for.

5. The method of claim 1, further comprising maintaining the current element of the second data structure to establish a correspondence between the original function and a provided address of an interceptor function copy.

6. The method of claim 5, further comprising selecting a next successive element of the second data structure as the current element for each new request for instrumentation.

7. The method of claim 1, wherein a reference to the second data structure comprises at least one of a memory address of and an index to the second data structure.

8. The method of claim 1, wherein the starting address of a copy of the interceptor function is provided in a direct correspondence with the current element of the second data structure.

9. The method of claim 1, wherein the interceptor function comprises obtaining an address being currently executed;

retrieving, from a corresponding copy of the first data structure, the starting address of a memory region that contains the address being currently executed;

fetching the reference to the second data structure from the copy of the first data structure;

computing an index to the second data structure as the fetched reference to the second data structure added to the difference between the address being currently executed and the retrieved starting address, the difference divided by the size of the interceptor function; and reading, from the second data structure indexed with the computed index, the address of an original function to pass control to.

10. An article comprising:

a machine accessible physical medium having a plurality of machine readable instructions, wherein when the instructions are executed by a processor, the instructions provide for binary instrumentation by:

allocating a contiguous memory region, wherein a total number of original functions to be intercepted is unknown at the time of the allocation;

filling the memory region with (A) first and second platform independent high level non-assembly language copies of an interceptor function (B) but not any version of the original functions;

initializing a first data structure with at least a starting address, length of the allocated memory region, and a reference to a second data structure;

storing an address of one of the original functions to be intercepted in a current element of the second data structure upon request for instrumentation; and providing a starting address of the second copy of the interceptor function upon request for instrumentation;

wherein instructions for allocating the memory region, filling the memory region, and initializing the first data structure are executed upon initial request for instrumentation so that each time an additional original function needs to be intercepted a new copy of the interceptor function is associated with the additional original function.

11. The article of claim 10, wherein instructions for allocating the memory region, filling the memory region, and initializing the first data structure are executed only if all interceptor function copies of currently allocated memory regions are associated with previous requests for instrumentation.

12. The article of claim 10, further comprising instructions for duplicating the first data structure to associate each new copy of the first data structure with each newly allocated memory region.

13. The article of claim 10, wherein the second data structure comprises elements to store addresses of original functions instrumentation was requested for.

14. The article of claim 10, further comprising instructions for maintaining the current element of the second data structure to establish a correspondence between the original function and a provided address of an interceptor function copy.

15. The article of claim 14, further comprising instructions for selecting a next successive element of the second data structure as the current element for each new request for instrumentation.

16. The article of claim 10, wherein a reference to the second data structure comprises at least one of a memory address of and an index to the second data structure.

17. The article of claim 10, wherein the starting address of the second copy of the interceptor function is provided in a direct correspondence with the current element of the second data structure.

18. The article of claim 10, wherein interceptor function comprises instructions for obtaining an address being currently executed;

retrieving, from a corresponding copy of the first data structure, the starting address of a memory region that contains the address being currently executed;

fetching the reference to the second data structure from said copy of the first data structure;

computing an index to the second data structure as the fetched reference to the second data structure added to the difference between the address being currently executed and the retrieved starting address, said difference divided by the size of the interceptor function; and reading, from the second data structure indexed with the computed index, the address of an original function to pass control to.

19. A system that performs binary instrumentation, comprising:

a processor, coupled to a memory, to allocate a contiguous memory region included in the memory, wherein a total number of original functions to be intercepted is unknown at the time of the allocation; to fill said memory region with (A) first and second platform independent high level non-assembly language copies of an interceptor function (B) but not any version of the original functions; to initialize a first data structure with at least a starting address, length of the allocated memory region, and a reference to a second data structure; to store an address of one of the original functions to be intercepted in a current element of the second data structure upon request for instrumentation; and to provide a starting address of the second copy of the interceptor function upon request for instrumentation;

wherein instructions for allocating the memory region, filling the memory region, and initializing the first data structure are executed upon initial request for instrumentation so that each time an additional original function needs to be intercepted a new copy of the interceptor function is associated with the additional original function.

20. The system of claim 19, wherein each one of the copies is not created until a corresponding request for instrumentation occurs such that the system is configured to dynamically adapt to the number of original functions to be instrumented.

21. The system of claim 19, wherein the processor is to allocate the memory region, fill the memory region, and initialize the first data structure only if all interceptor function copies of currently allocated memory regions are associated with previous requests for instrumentation.

22. The system of claim 19, wherein the processor is to duplicate the first data structure to associate each new copy of the first data structure with each newly allocated memory region.

23. The system of claim 19, wherein the second data structure comprises elements to store addresses of original functions instrumentation was requested for.

24. The system of claim 19, wherein the processor is to maintain the current element of the second data structure to establish a correspondence between one of the original functions and a provided address of one of the interceptor function copies.

25. The system of claim 24, wherein the processor is to select a next successive element of the second data structure as the current element for each new request for instrumentation and the copies are stored adjacent to one another.

26. The system of claim 19, wherein reference to the second data structure comprises at least one of a memory address of and an index to the second data structure.

27. The system of claim 19, wherein the starting address of a copy of the interceptor function is provided in a direct correspondence with the current element of the second data structure.

28. The system of claim 19, wherein the processor is to:
obtain an address being currently executed;
retrieve from a corresponding copy of the first data structure the starting address of a memory region that contains the address being currently executed;
fetch the reference to the second data structure from said copy of the first data structure;
compute an index to the second data structure as the fetched reference to the second data structure added to the difference between the address being currently executed and the retrieved starting address, said difference divided by the size of the interceptor function; and
read, from the second data structure indexed with the computed index, the address of an original function to pass control to.

* * * * *